UNITED STATES PATENT OFFICE.

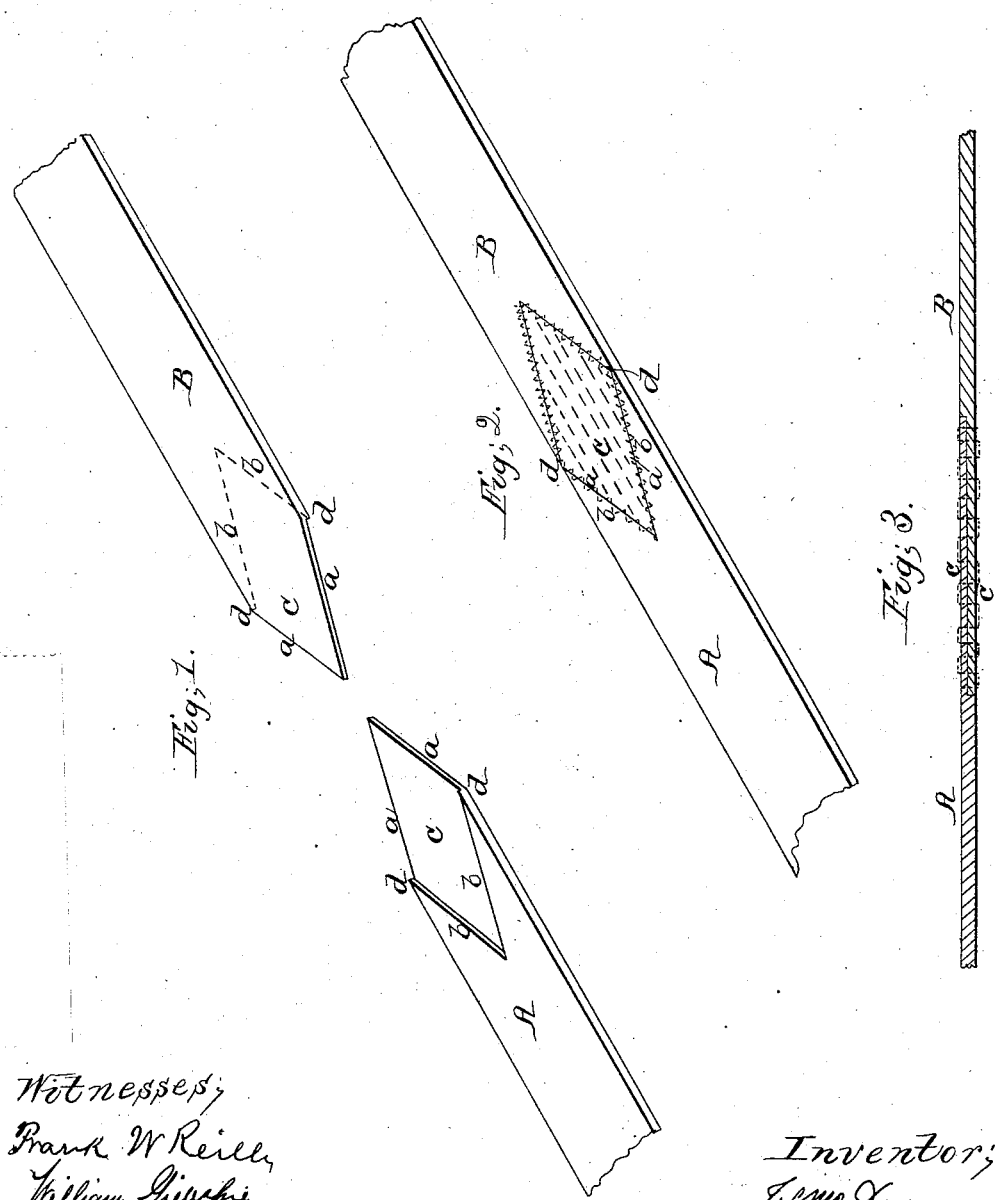

J. McDOUGALL, OF MASONVILLE, MICHIGAN.

MODE OF FORMING JOINTS IN INDIA-RUBBER BELTING.

Specification of Letters Patent No. 25,749, dated October 11, 1859.

*To all whom it may concern:*

Be it known that I, JAMES McDOUGALL, of Masonville, in the county of Delta and State of Michigan, have invented a new and Improved Mode of Forming Joints in India-Rubber Belting; and I do hereby declare that the following in a full, clear, and exact description of the same, reference being had to the accompanying drawings, making part of this specification, in which—

Figure 1, is a perspective view representing the two portions of a band which are to form the joint. Fig. 2, is a perspective view of the joint. Fig. 3, is a longitudinal section of the same.

Similar letters of reference indicate like parts in all the figures.

India-rubber belting, as ordinarily constructed, is composed of cloth saturated and coated with india-rubber and doubled in such a manner that the junction of its edges is formed along the center of one face of the belting, having a fold at each edge. The best method hitherto adopted for forming the joints in such a belt is to split it to a certain distance from each end and to remove the terminal portion of one of the two layers at one end of the belt and one of the opposite layers at the other end, by cutting them square across where the splits terminate, and lapping together the single layers thus left and cementing and stitching them together; but by this method the selvage of the belt is destroyed for the whole length of the joint.

My invention consists in so forming the joint by cutting the two ends which are to be joined, to such an angular, pointed or rounded form that by splitting the terminal portions and cutting away the opposite layers at the two ends in lines or angles corresponding with those of the terminal edges, the lap joint may be formed and the sides of the tongues upon one piece of belting shall be protected by the selvages of the cavities in the opposite end, as will be hereinafter set forth.

To enable others skilled in the art to use my invention, I will describe it with reference to the drawings.

In the example of my invention which I have represented, the ends of the two portions A, and B, of the belt are cut to form acute angles *a, a,* and the said portions are cut half through, that is to say, through one of the two layers of which they are composed in lines *b, b,* forming precisely similar acute angles to *a, a,* but occupying a position relatively to the sides of the belt precisely the reverse of *a, a*. The said lines *b, b,* are cut in opposite sides of the two portions A, and B, of the belt. By splitting the terminal portions from the ends *a, a,* to the lines *b, b,* and removing the parts on the sides cut in the said lines *b, b,* a rhomb-shaped tongue and cavity *c,* is left at each end of the belt, of but half the thickness of the body of the belt; and by lapping these two tongues together, the edges *a, a,* of one will fit to the edges *b, b,* of the other, as shown in Fig. 2, and form a lap-joint flush on both sides with the general surfaces of the belt, as shown in Fig. 3. By applying a coating of cement to the inner faces of these tongues and sewing them together in the manner illustrated in Figs. 2 and 3, where the stitches are shown in red color, a joint is made that is perfectly smooth and almost invisible, and that is stronger than any other portion of the belt, and that has a perfect selvage except at the two points *d, d*.

Instead of making the ends of the belt pointed, as shown, they may be rounded, or the ends may be curved instead of angular; but the line or lines *b, b,* must in all cases correspond in form with the terminal edge *a, a*.

It will be observed that by the use of my improvement the tongue, or that portion of each belt end which has its selvage cut away, is fitted into a corresponding cavity in the opposite belt end, the sides of which cavity have their selvages preserved and therefore offer full protection to the joint. By thus obtaining the protection of the selvages of the belt, it is obvious that the joint is rendered much more secure and durable than the ordinary method of union.

I do not claim the splitting of the belt to form a flush lap-joint, nor yet the cementing or sewing together of the two lapping portions, but

What I claim as my invention and desire to secure by Letters Patent, is—

The employment in combination with the belt ends A, B, of the tongues and cavities (*c c*) so that the sides of the tongue portions shall be protected by the selvages of the cavity parts, substantially as herein shown and described.

J. McDOUGALL.

Witnesses:
FRANK W. REILLY,
WILLIAM GILLESPIE.